United States Patent
Lee et al.

(10) Patent No.: US 7,898,946 B2
(45) Date of Patent: Mar. 1, 2011

(54) COMMUNICATION SYSTEM AND METHOD CAPABLE OF IMPROVING DATA TRANSMISSION EFFICIENCY OF TCP IN ASYMMETRIC NETWORK ENVIRONMENTS

(75) Inventors: Ji-hoon Lee, Cheongju (KR); Ki-soo Chang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1341 days.

(21) Appl. No.: 10/718,692

(22) Filed: Nov. 24, 2003

(65) Prior Publication Data

US 2004/0109477 A1    Jun. 10, 2004

(30) Foreign Application Priority Data

Dec. 4, 2002   (KR) .................. 10-2002-0076589

(51) Int. Cl.
    *H04J 1/16*   (2006.01)
(52) U.S. Cl. ...................................... 370/230; 370/235
(58) Field of Classification Search ............... 370/230, 370/231, 232, 236, 237, 535, 557, 389, 465, 370/428, 412, 386, 395, 229, 395.32; 710/54; 709/232
See application file for complete search history.

(56) References Cited

U.S. PATENT DOCUMENTS

| | | | |
|---|---|---|---|
| 4,799,215 A * | 1/1989 | Suzuki | 370/227 |
| 5,042,029 A * | 8/1991 | Hayakawa | 370/231 |
| 5,781,532 A * | 7/1998 | Watt | 370/236 |
| 6,215,769 B1 * | 4/2001 | Ghani et al. | 370/230 |
| 6,535,482 B1 * | 3/2003 | Hadi Salim et al. | 370/229 |
| 6,542,931 B1 * | 4/2003 | Le et al. | 709/228 |
| 6,622,172 B1 * | 9/2003 | Tam | 709/232 |
| 6,853,637 B1 * | 2/2005 | Norrell et al. | 370/352 |
| 6,894,974 B1 * | 5/2005 | Aweya et al. | 370/230.1 |
| 6,901,593 B2 * | 5/2005 | Aweya et al. | 718/104 |
| 6,993,602 B2 * | 1/2006 | Merrill et al. | 710/54 |
| 7,031,259 B1 * | 4/2006 | Guttman et al. | 370/235 |
| 7,088,722 B1 * | 8/2006 | Hann | 370/395.2 |
| 2002/0154629 A1 * | 10/2002 | Lohman et al. | 370/386 |

* cited by examiner

*Primary Examiner*—Kwang B Yao
*Assistant Examiner*—Syed Bokhari
(74) *Attorney, Agent, or Firm*—Sughrue Mion, PLLC

(57) ABSTRACT

A communication system capable of improving a TCP transmission efficiency includes a transmitter for transmitting data packets; a receiver connected to the transmitter, and for receiving the data packets and transmitting to the transmitter response signals with respect to the received data packets; and a multiplexer for multiplexing and transmitting to the transmitter the response signals transmitted from the receiver, and transmitting the transmitted data packets from the transmitter to a corresponding receiver, the multiplexer provided with a queue status monitor for monitoring queue statuses of the transmitted data packets and/or response signals, and a congestion control adjuster instructing the receiver to hold or compress the response signals based on the monitored queue status. Accordingly, the communication system can carry out efficient TCP congestion control by reducing a load of the TCP congestion control of the transmitters and receivers.

15 Claims, 5 Drawing Sheets

COMMUNICATION SYSTEM AND METHOD CAPABLE OF IMPROVING DATA TRANSMISSION EFFICIENCY OF TCP IN ASYMMETRIC NETWORK ENVIRONMENTS

This application claims the priority of Korean Patent Application No. 10-2002-0076589 filed on Dec. 4, 2002, in the Korean Intellectual Property Office, the disclosure of which is incorporated herein in its entirety by reference.

BACKGROUND

1. Field of the Invention

The present invention relates to an apparatus and a method capable of improving a data transmission efficiency of transmission control protocol (TCP), and more particularly to a communication system and a method capable of improving a data transmission efficiency of TCP in the environments of an asymmetric network such as Asymmetric Digital Subscriber Line (ADSL) and the like.

2. Description of the Related Art

The ADSL is a technology for transmitting digital information in a high bandwidth connection through telephone lines installed at homes and businesses. The ADSL has an asymmetrical structure that uses most of the channel for downstream transmissions to send information to users in the downstream direction and allocates a small part of the channel for receiving information from the users in the upstream direction. The ADSL provides a 9 Mbps downstream rate and a 800 Kbps upstream rate as maximum rates through existing telephone lines.

In the meantime, the TCP is, as an end-to-end transmission protocol operating together with the Internet protocol (IP), a protocol widely used in applications such as web-based Hyper Text Transfer Protocol (HTTP), Simple Mail Transfer Protocol (SMTP) for emails, File Transfer Protocol (FTP), Telnet, and so on.

Figure 1:
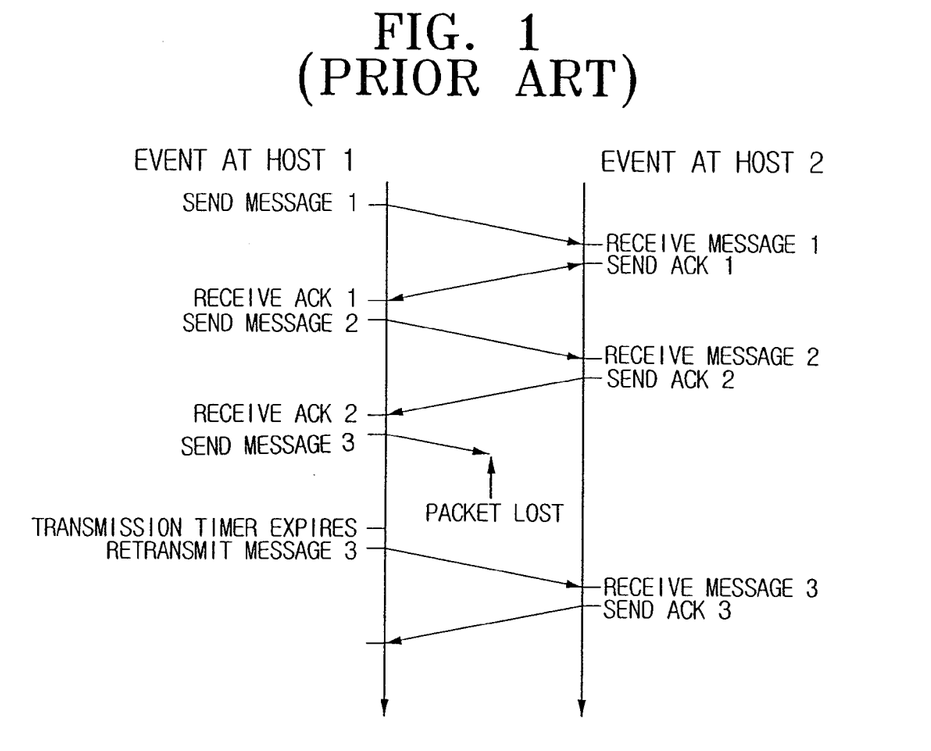
FIG. 1 is a view for illustrating TCP data transmissions and receptions at a transmitter and a receiver of a conventional communication system.

FIG. 1 is a view for illustrating TCP data transmissions and receptions at a transmitter and a receiver of a conventional communication system. In FIG. 1, the TCP uses a method of transmitting Acknowledgement (ACK) packets to the transmitter to confirm that the receiver has received the data in order to increase reliability of the data transmissions and receptions. An ACK packet includes window information for data flow controls. Here, the window refers to a size of a buffer available at a certain time, and the receiver transmits to the transmitter information on the buffer size, which is called "window advertisement". The transmitter varies a window size based on the window advertisement when transmitting subsequent data. If an ACK packet is not received in a certain period of time from the receiver with respect to data transmitted by the transmitter, the transmitter decides that the transmitted data has been lost due to network congestion, and retransmits the same data.

However, in the asymmetric bandwidth environments as in the ADSL, it takes much delay time for an ACK packet to get to the transmitter due to a narrow bandwidth of a path for the ACK packet to go through, and such environments can cause ACK packet losses due to uplink congestion or reduce a TCP transmission rate due to the stack of ACK packets.

The Performance Implications of Link Characteristics (PILC) working group of the Internet Engineering Task Force (IETE) has proposed the ACK Congestion Control (ACC) scheme and the ACK Filtering (AF) scheme as typical congestion control schemes in the asymmetric bandwidth environments.

Figure 2:
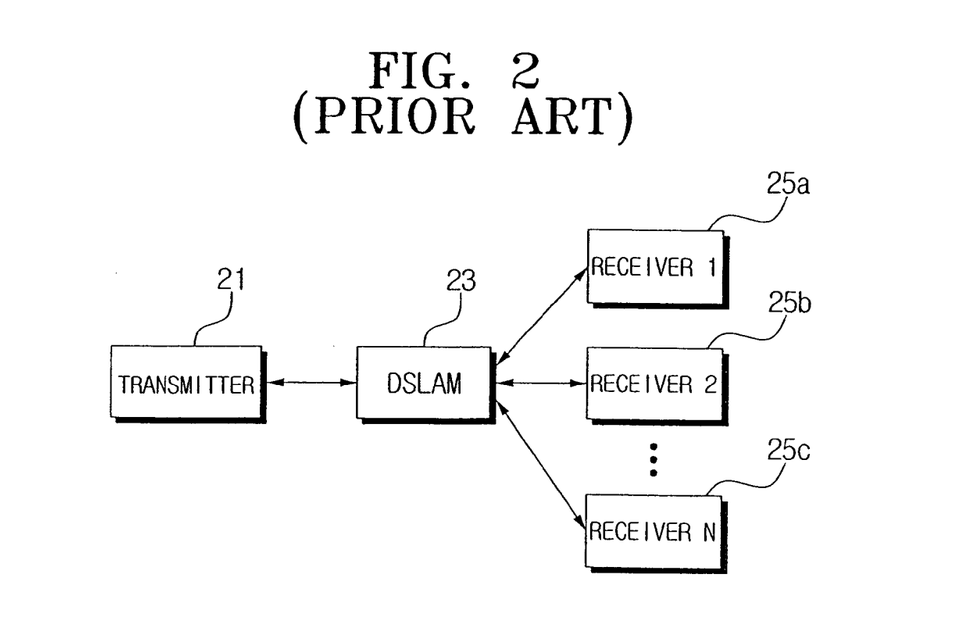
FIG. 2 is a block diagram for schematically illustrating a conventional ACC-based communication system.

FIG. 2 is a block diagram for schematically illustrating a conventional ACC-based communication system. In FIG. 2, the ACC-based communication system includes a transmitter 21 for transmitting data, a Digital Subscriber Line Access Multiplexer (DSLAM) 23, and at least one receiver 25a, 25b, and 25c for receiving data from the transmitter 21.

The transmitter 21 uses most of the channel to transmit downstream information to the receivers 25a, 25b, and 25c through the ADSL, and allocates a small part of the channel to receive information from the receivers 25a, 25b, and 25c. That is, the transmitter 21 provides a 9 Mbps downstream rate and a 800 Kbps upstream rate at maximum through the existing phone lines.

The DSLAM 23 stands for a Digital Subscriber Line Access Multiplexer, and plays a role of receiving signals from subscribers via subscriber lines and sending the signals to a high-speed backbone network by using a multiplexing technology.

The receivers 25a, 25b, and 25c receive and transmit data with the transmitter 21 through the DSLAM 23. In this case, the receivers 25a, 25b, and 25c receive data from the transmitter 21 at a maximum 9 Mbps downstream rate, and transmit data at a maximum 800 Kbps upstream rate to the transmitter 21.

The ACC scheme is a method instructing the receivers 25a, 25b, and 25c to hold ACK packets in consideration of a buffer size of the downlink from the DSLAM 23 to the receivers 25a, 25b, and 25c. That is, if it is predicted that downlink data from the DSLAM 23 to the respective receivers 25a, 25b, and 25c is congested in volume, the transmitter 21 instructs the respective receivers 25a, 25b, and 25c to hold the transmissions of ACK packets for a certain period of time in consideration of downlink buffer sizes of the respective receivers 25a, 25b, and 25c. Accordingly, the respective receivers 25a, 25b, and 25c hold for a certain period of time the ACK packets with respect to data received from the transmitter 21 according to the holding instructions, and transmit the ACK packets to the transmitter 21.

Figure 3:
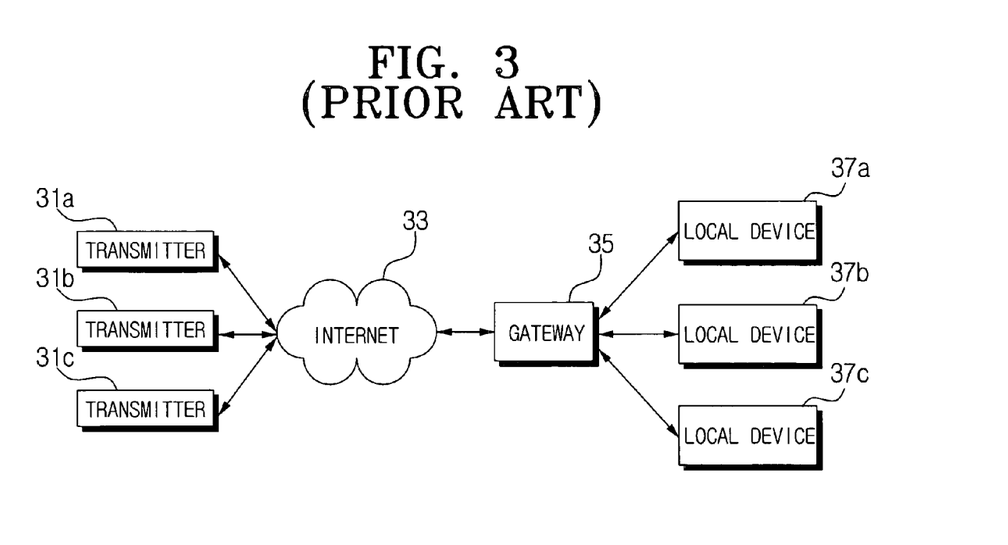
FIG. 3 is a block diagram for schematically illustrating a conventional AF-based communication system.

FIG. 3 is a block diagram for schematically illustrating a conventional AF-based communication system. In FIG. 3, an AF-based communication system is provided with at least one transmitter 31a, 31b, and 31c for transmitting data, a gateway 35, and at least one receiver 37a, 37b, and 37c for receiving data from at least one transmitter 31a, 31b, and 31c. Here, the gateway 35 is connected to at least one transmitter 31a, 31b, and 31c through the Internet 33.

The transmitters 31a, 31b, and 31c can transmit data packets to a plurality of undefined objects at the same time. The transmitters 31a, 31b, and 31c each use most of the channel to transmit downstream to the receivers 37a, 37b, and 37c, and allocate a small part of the channel to receive information from the receivers 37a, 37b, and 37c. That is, the transmitters 31a, 31b, and 31c provide a maximum downstream rate of 9 Mbps and a maximum upstream rate of 800 Kbps through the existing phone lines.

The gateway 35 is a device used to connect a local area network (LAN) to different communication networks, and is a network point playing a role of an entrance to a different communication network. That is, the gateway is used in connecting two different communication networks. From a routing aspect, the Internet 33 can be referred to as a network having many gateway nodes and host nodes.

The receivers 37a, 37b, and 37c receive and transmit data from and to the transmitters 31a, 31b, or 31c through the gateway 35. In this case, the receivers 37a, 37b, and 37c receive data at a maximum downstream rate of 9 Mbps from the transmitter 31*a*, 31*b*, or 31*c*, and transmit data at a maximum upstream rate of 800 Kbps to the transmitter 31*a*, 31*b*, or 31*c*.

The AF scheme removes ACK packets stored in a buffer (not shown) of the gateway 35 in a case that the network is congested with data traffic, fills the buffer with recent ACK packets received from the receivers 37*a*, 37*b*, and 37*c*, and transmits the new ACK packets to the transmitters 31*a*, 31*b*, and 31*c*.

However, the conventional ACC-based communication system takes only the downlink into consideration, but does not take the queue length in a buffer into consideration in case of the uplink from the receivers 25*a*, 25*b*, and 25*c* to the DSLAM 23. Accordingly, in a case that uplink data from the receivers 25*a*, 25*b*, and 25*c* is piled up, the ACK packets transmitted from the receivers 25*a*, 25*b*, and 25*c* may not be transmitted to the transmitter 21, and the transmitter 21 acknowledges that transmitted data has been lost on the way of transmission, and retransmits data, to thereby deteriorate a TCP transmission rate by that much.

Further, the conventional AF-based communication system removes ACK packets stored in a buffer in a case of congested data traffic, and transmits new ACK packets only, which may result in burst data traffic transmissions.

SUMMARY

The present invention has been advised to solve the above problem, so it is an exemplary objective of the present invention to provide a communication system and a method capable of improving TCP data transmission efficiency in asymmetric network environments such as ADSL.

In order to achieve the above exemplary objective, a communication system according to a first illustrative embodiment of the present invention comprises a transmitter for transmitting data packets; at least one receiver connected to the transmitter, and for receiving the data packets and transmitting to the transmitter response signals with respect to the received data packets; and a multiplexer for multiplexing and transmitting to the transmitter the response signals transmitted from the receiver, and transmitting the transmitted data packets from the transmitter to a corresponding receiver. In here, the multiplexer is provided with a queue status monitor for monitoring queue statuses of the transmitted data packets and/or response signals, and a congestion control adjuster instructing the receiver to hold or compress the response signals based on the monitored queue status.

Preferably, the receiver further includes a response signal holding/compressing unit for, if instructed by the congestion control adjuster to hold the response signals, holding the response signals for a predetermined period of time, and, if instructed by the congestion control adjuster to compress the response signals, compressing the response signals for a predetermined period of time.

Here, the congestion control adjuster instructs a corresponding receiver to hold the response signals (i.e., ACK packets) if a queue status of the monitored data packets is over a first threshold. Further, the congestion control adjuster instructs a corresponding receiver to compress the response signals if a queue status of the monitored data packets is under a first threshold and a queue status of the response signals is over a second threshold.

Further, the transmitter transmits the data packets at a high rate of over 6 Mb a second, and the receiver transmits the response signals at a low rate of under 900 Kb a second.

In order to achieve the above exemplary objective, a communication system according to a second illustrative embodiment of the present invention comprises at least one transmitter for transmitting data packets; at least one receiver belonging to a private network and connected to the transmitter, and for receiving the data packets and transmitting to the transmitter response signals with respect to the received data packets; and a gateway for arbitrating a communication protocol between the transmitter and the private network. The gateway is provided with a queue status monitor for monitoring queue statuses of the transmitted data packets and/or response signals, and a congestion control adjuster instructing the receiver to hold or compress the response signals based on the monitored queue status.

Preferably, the receiver includes a response signal holding/compressing unit for, if instructed by the congestion control adjuster in a DSLAM to hold the response signals, holding the response signals for a predetermined period of time, and, if instructed by the congestion control adjuster to compress the response signals, compressing the response signals for a predetermined period of time.

In the meantime, for the communication systems according to the first and second illustrative embodiments of the present invention, a communication method in which a receiver receiving data packets from a transmitter transmits to the transmitter response signals corresponding to the data packets, comprises steps of monitoring queue statuses of the transmitted or received data packets and/or response signals; instructing the receiver to hold or compress the response signals corresponding to the monitored queue statuses; and holding the response signals for a predetermined period of time if the holding of the response signals is instructed, and compressing the response signals for a predetermined period of time if the compression of the response signals is instructed.

Accordingly, the present invention can reduce the TCP congestion control load in the transmitter or the receiver to carry out efficient TCP congestion controls.

BRIEF DESCRIPTION OF THE DRAWINGS

The invention will be described in detail with reference to the following drawings in which like reference numerals refer to like elements, and wherein.

DETAILED DESCRIPTION OF THE ILLUSTRATIVE, NON-LIMITING EMBODIMENTS

Hereinafter, the present invention will be described in detail with reference to the accompanying drawings.

Figure 4:
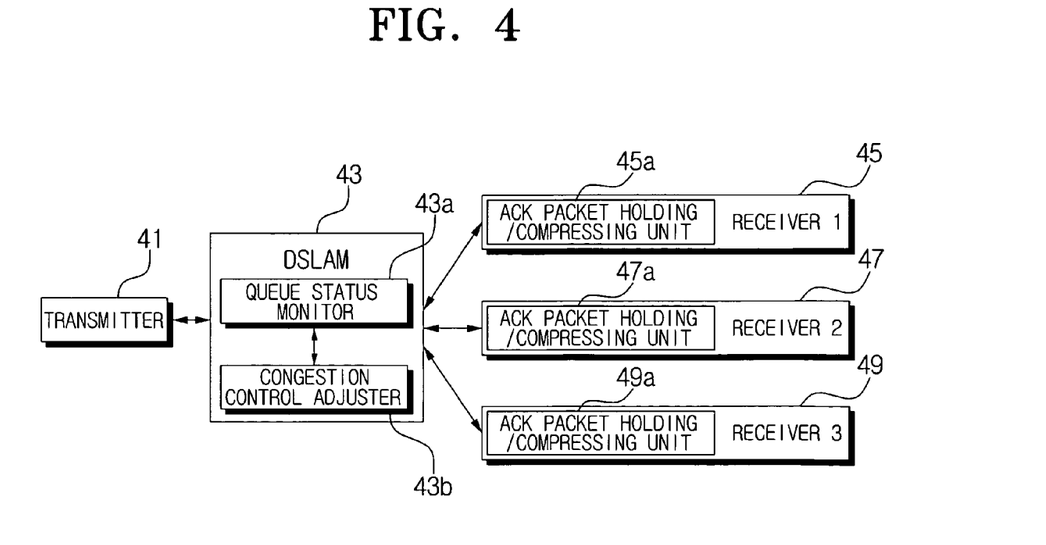
FIG. 4 is a block diagram for schematically illustrating a communication system according to a first embodiment of the present invention.

FIG. 4 is a block diagram for schematically illustrating a communication system according to a first embodiment of the present invention. Referring to FIG. 4, the communication system is provided with a transmitter 41, a DSLAM 43, and at least one or more receivers 45, 47, and 49. FIG. 4 shows that three receivers 45, 47, and 49 are connected to the DSLAM 43. The DSLAM 43 has a queue status monitor 43a and a congestion control adjuster 43b. Further, the receivers 45, 47, and 49 have ACK packet holding/compressing units 45a, 47a, and 49a, respectively.

The transmitter 41 uses most of the channel to transmit downstream to the receivers 45, 47, and 49 according to the regulations for asymmetric wired networks such as ADSL, and allocates a small part of the channel to receive information from the receivers 45, 47, and 49. That is, the transmitter 41 can transmit data packets to the receivers 45, 47, and 49 at a downstream rate of 6 Mbps to a maximum downstream rate of 9 Mbps through the existing telephone lines.

At least one of the respective receivers 45, 47, and 49 is connected to the transmitter 41, receives data packets transmitted from the transmitter 41, and transmits to the transmitter 41a response signal with respect to the received data packets. The receivers 45, 47, and 49 each can transmit to the transmitter 41 a response signal with respect to data packets at a low rate slower than 900 Kbps through the existing telephone lines. The present invention is implemented to transmit an ACK packet from the receivers 45, 47, and 49 to the transmitter 41 as one of the response signals.

The DSLAM 43 stands for "Digital Subscriber Line Access Multiplexer" (herein referred to as "multiplexer" or "DSLAM"), and the DSLAM 43 receives and multiplexes response signals transmitted from the plurality of receivers 45, 47, and 49. The DSLAM 43 plays a role of transmitting a multiplexed response signal to the transmitter 41 through a high-speed backbone network. Further, the DSLAM 43 plays a role of transmitting data packets transmitted from the transmitter 41 to a corresponding receiver 45, 47, or 49.

In the meantime, the queue status monitor 43a provided in the DSLAM 43 is implemented to monitor a queue status of data packets transmitted from the transmitter 41 to the receivers 45, 47, and 49, or to monitor a queue status of data packets transmitted from the transmitter 41 to the receivers 45, 47, and 49 and a queue status of an ACK packet transmitted from the receivers 45, 47, and 49 to the transmitter 41. In here, the queue refers to a waiting stream of data passing the DSLAM 43, and a queue status refers to an entire size of waiting packets each of which is a data unit.

The DSLAM 43 has a first-in first-out buffer (not shown) for outputting data packets transmitted from the transmitter 41 and response signals transmitted from the respective receivers 45, 47, and 49 in the order inputted thereto, and the queue status monitor 43a monitors queue statuses of data packets stacked in the buffer, or data packets and response signals (ACK packets). Here, the number of buffers provided in the DSLAM 43 is preferably provided enough for transmitted data packets and respective response signals to be processed in parallel on the first-input first-output basis.

The congestion control adjuster 43b instructs the receivers 45, 47, and 49 to hold or compress response signals according to queue statuses of data packets, or data packets and response signals monitored by the queue status monitor 43a. That is, in a case that the queue status monitor 43a monitors only the queue status of data packets, the congestion control adjuster 43b classifies queue statuses of data packets into a smooth status, a congestion status, and a congestion prediction status, and, in a case that a queue status of data packets is the congestion status, the congestion control adjuster 43b instructs a corresponding receiver 45, 47, or 49 to hold a response signal for a set period of time. In here, the congestion status refers to an occasion that data packets stored in the buffer are over a first threshold, and the congestion prediction status refers to an occasion that data packets stored in the buffer are over a second threshold. If data packets stored in the buffer is over a certain setting value, that is, over a second threshold, the congestion control adjuster 43b predicts that network congestion will occur with a response signal transmitted to the transmitter 41 from the receivers 45, 47, and 49. In a case that a queue status of data packets is the congestion prediction status, the congestion control adjuster 43b instructs a corresponding receiver 45, 47, or 49 to compress a response signal for a set period of time. Here, the holding refers to transmitting a response signal after delaying it for a set period of time, and the compression includes a case of transmitting only the most recent response signal out of response signals occurring for a period of time from the receivers 45, 47, and 49. At this time, it is preferable that the second threshold is set to become larger than the first threshold, but, as not being limited to this, the first threshold may be set to become larger than the second threshold. Further, the congestion control adjuster 43b is preferably implemented to instruct only a corresponding receiver 45, 47, or 49 to hold or compress a response signal based on queue statuses of data packets and/or response signals.

Further, in case that the queue status monitor 43a monitors queue statuses of data packets and response signals, the congestion control adjuster 43b classifies the queue statuses of data packets and response signals into the smooth status, a first congestion status, and a second congestion status, and, in a case that a data packet queue status is in the first congestion status, the congestion control adjuster 43b instructs a corresponding receiver 45, 47, or 49 to hold the response signal for a set period of time. Further, in a case that a data packet queue status is in the second congestion status, the congestion control adjuster 43b instructs a corresponding receiver 45, 47, or 49 to compress the response signal for a set period of time. In here, the first congestion status refers to an occasion that data packets stored in the buffer are over a third threshold, and the second congestion status refers to an occasion that response signals stored in the buffer are over a fourth threshold. In this case, the third threshold can be set to be equal to the fourth threshold. Further, the congestion control adjuster 43b is preferably implemented to instruct corresponding receivers 45, 47, and/or 49 to hold or compress response signal(s) based on the queue statuses of data packets and/or response signals.

Here, if a queue status is in the smooth status, traffic transmission and reception environments are smooth, so that there is no need for the congestion control adjuster 43b to instruct the receivers 45, 47, and 49 for holdings or compressions.

If instructions are made to hold or compress response signals by the congestion control adjuster 43b, the ACK packet holding/compressing unit 45a, 47a, or 49a of the receiver 45, 47, or 49 receiving a holding or a compressing instruction holds or compresses a response signal for a predetermined period of time. In here, the ACK packet holding/compressing unit 45a, 47a, or 49a can be implemented to transmit only the most recent response signal of response signals generated in the receiver 45, 47, or 49. If a predetermined period of time lapses, the receivers 45, 47, and 49 transmit the held response signal or the compressed response signal to the transmitter 41.

Figure 5:
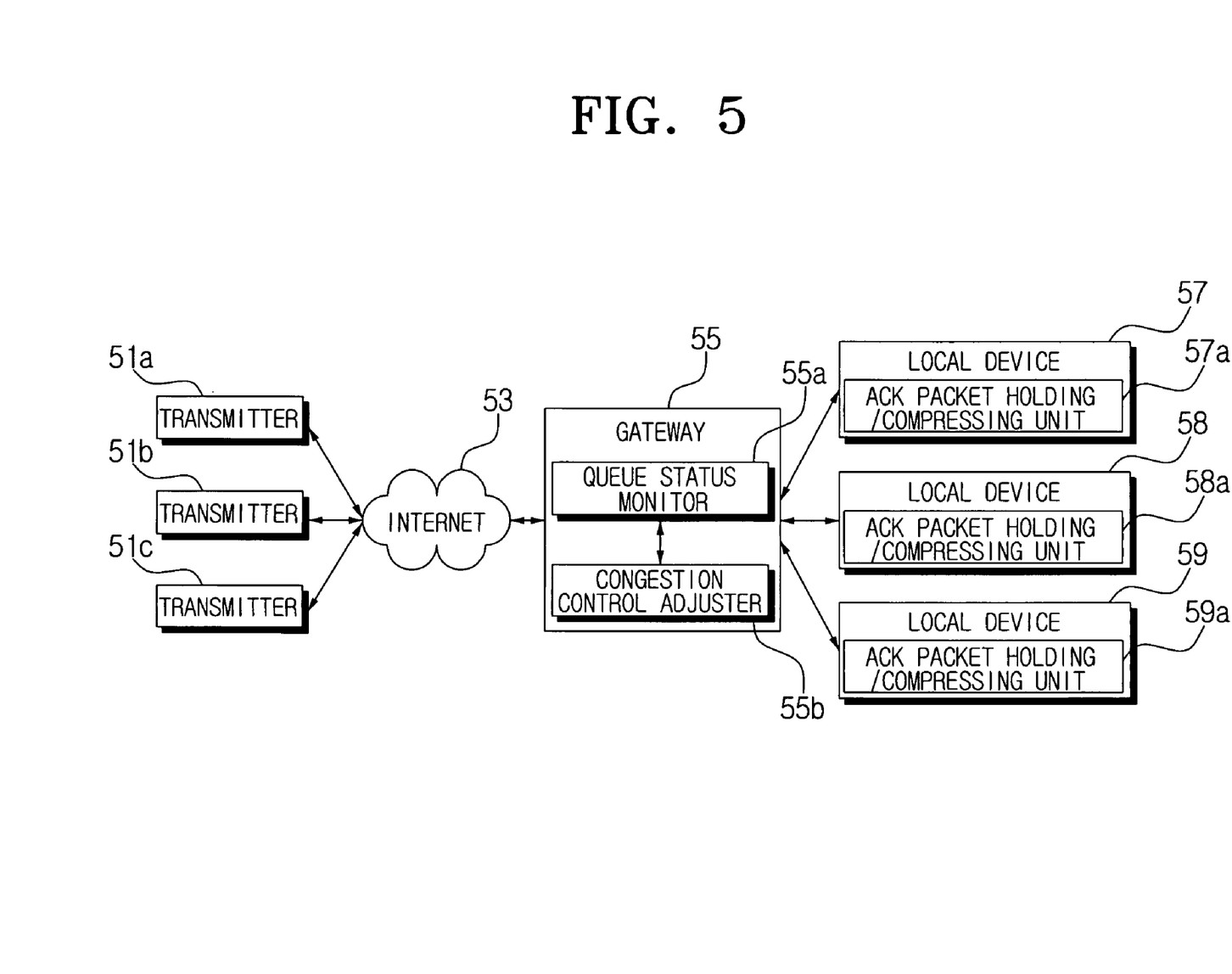
FIG. 5 is a block diagram for schematically illustrating a communication system according to a second embodiment of the present invention.

FIG. 5 is a block diagram for schematically illustrating a communication system according to a second embodiment of the present invention. In FIG. 5, the communication system is provided with at least one transmitter 51a, 51b, and 51c, a gateway 55, and at least one receiver 57, 58, and 59 receiving data from the at least one transmitter 51a, 51b, and 51c. Further, the gateway 55 has a queue status monitor 55a and a congestion control adjuster 55b. Further, the receivers 57, 58, and 59 have ACK packet holding/compressing units 57a, 58a, and 59a, respectively. Here, the gateway 55 can connect to at least one transmitter 51a, 51b, or 51c through an internet 53. Hereinafter, descriptions are made on an occasion that three receivers 57, 58, and 59 simultaneously receive data packets from three transmitters 51a, 51b, and 51c.

The transmitters 51a, 51b, and 51c can transmit data packets to a plurality of receivers 57, 58, and 59 at the same time.

The transmitters 51a, 51b, and 51c each use most of the channel to transmit downstream to the receivers 57, 58, and 59 according to the regulations for asymmetric wire networks such as ADSL, and allocate a small part of the channel to receive information from the receivers 57, 58, and 59. That is, transmitters 51a, 51b, and 51c can transmit data packets to the receivers 57, 58, and 59 at a downstream rate of 6 Mbps to a maximum downstream rate of 9 Mbps through the existing telephone lines.

At least one of the respective receivers 57, 58, and 59 can be connected to at least one of the transmitters 51a, 51b, and 51c through the internet 53 and the gateway 55, and can receive data packets transmitted from the transmitter 51a, 51b, and 51c. Further, The receivers 57, 58, and 59, which are receiving data packets, transmit to a corresponding transmitter 51a, 51b, or 51c a response signal with respect to the received data packets. The receivers 57, 58, and 59 each can transmit a response signal to the transmitters 51a, 51b, and 51c at a low rate slower than 900 Kbps through the existing telephone lines. The present invention is implemented to transmit an ACK packet from each of the receivers 57, 58, and 59 to the transmitter 51a, 51b, or 51c as an example of a response signal.

The gateway 55 is a device used to connect a local area network (LAN) to different communication networks, and is a network point playing a role of an entrance to a different communication network. That is, the gateway is used in case of connecting two different communication networks. From a routing aspect, the internet 53 can be referred to as a network having many gateway nodes and host nodes.

A receiver 57, 58, or 59 receives and transmits data from and to at least one of the transmitters 51a, 51b, and 51c through the gateway 55. In this case, the receiver 57, 58, or 59 receives data at a maximum downstream rate of 9 Mbps from the transmitter 51a, 51b, or 51c.

In the meantime, the queue status monitor 55a provided in the gateway 55 monitors data packets transmitted from the transmitters 51a, 51b, and 51c to the receiver 57, 58, or 59. However, the queue status monitor 55a can be implemented to monitor all queue statuses for data packets transmitted from the transmitter 51a, 51b, or 51c to the receiver 57, 58, or 59 and response signals transmitted from the receiver 57, 58, or 59 to the transmitter 51a, 51b, or 51c The gateway 55 has a first-in first-out buffer (not shown) for outputting data packets transmitted from the transmitter 51a, 51b, or 51c or response signals transmitted from the respective receivers 57, 58, and 59 in the order inputted thereto, and the queue status monitor 55a monitors queue statuses of data packets and response signals (ACK packets) stacked in the buffer. Here, the number of buffers provided in the gateway 55 is preferably enough for transmitted data packets and respective response signals to be processed in parallel on the first-input first-output basis.

The congestion control adjuster 55b instructs a corresponding receiver 57, 58, or 59 to hold data packets and/or response signals according to queue statuses of the data packets monitored by the queue status monitor 55a or the data packets and response signals monitored by the queue status monitor 55a. A subsequent process is the same as in the congestion control adjustments by the DSLAM, so detailed descriptions will be omitted.

Figure 6:
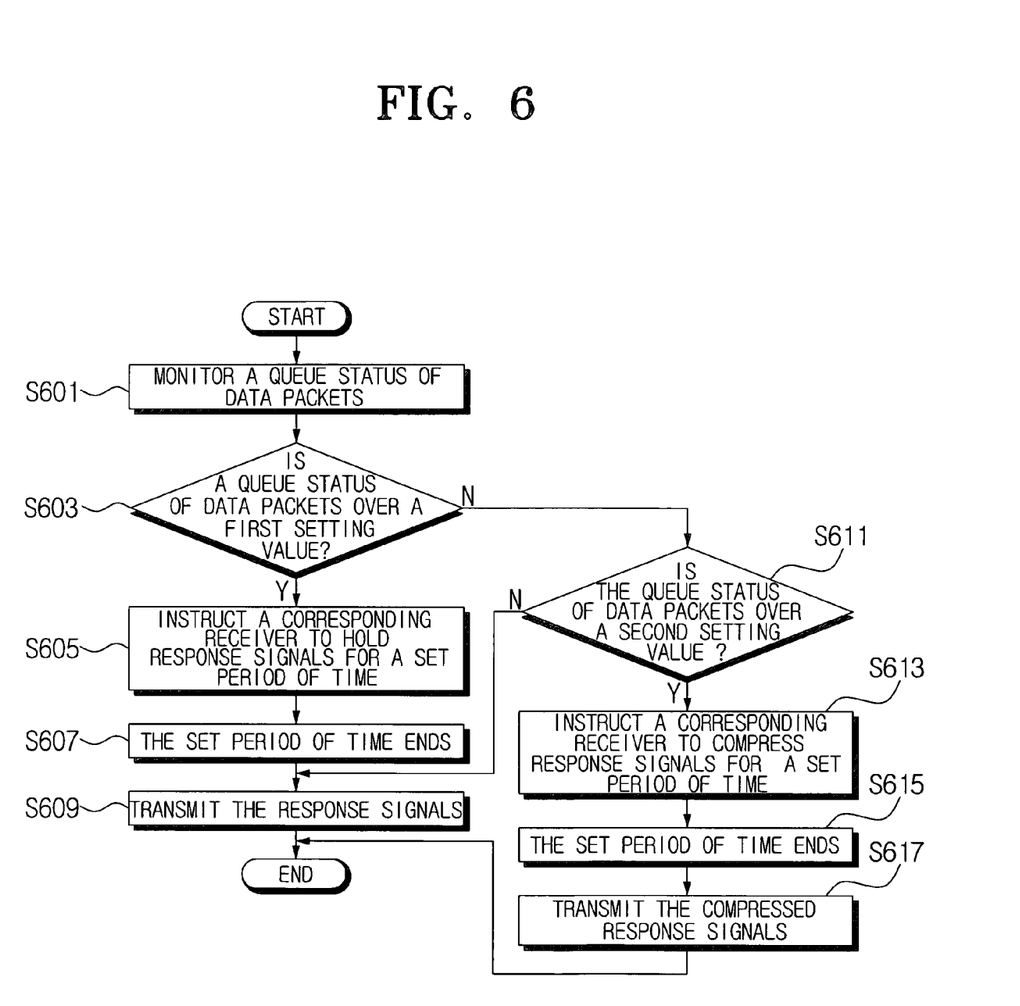
FIG. 6 is a flow chart for explaining a communication method for the communication systems shown in FIG. 4 and FIG. 5 according to a first embodiment of the present invention.

FIG. 6 is a flow chart for explaining a communication method for communication systems shown in FIG. 4 and FIG. 5 according to a first embodiment of the present invention. FIG. 6 shows an occasion that the queue status monitor 43a or 55a of the DSLAM 43 or the gateway 55 monitors only a queue status of data packets.

In FIG. 6, the queue status monitor 43a or 55a of the DSLAM 43 or the gateway 55 monitors a queue status of data packets transmitted from the transmitters 41 or 51a, 51b, and 51c to the receivers 45, 47, and 49, or 57, 58, and 59 (S601). The queue status monitor 43a or 55a monitors a queue status of data packets transmitted from one transmitter 41 to at least one of the plurality of receivers 45, 47, and 49 in case of the DSLAM 43, and monitors data packets transmitted from at least one of the plurality of transmitters 51a, 51b, and 51c to at least one of the plurality of receivers 57, 58, and 59 in case of the gateway 55.

The congestion control adjuster 43b or 55b classifies a queue status into the smooth status, the congestion status, and the congestion prediction status based on a status of the data packets that are stored in the buffer, as monitored by the queue status monitor 43a or 55a. In here, the smooth status refers to a status that data packet transmission is smooth, the congestion status refers to an occasion that data packets stored in the buffer are over a first threshold, and the congestion prediction status refers to an occasion that data packets stored in the buffer are over a second threshold. If data packets stored in the buffer are over a certain value, that is, over the second threshold, the congestion control adjuster 43b predicts that congestion occurs with response signals transmitted from the receivers 45, 47, and 49 to the transmitter 41.

If the number of respective data packets stored in the buffer is over the first threshold (S603), the congestion control adjuster 43b or 55b instructs the corresponding receivers 45, 47, and 49 or 57, 58, and 59 to hold response signals for a set period of time (S605). In this occasion, it is preferable that the set period of time is stored in a memory (not shown). The ACK packet holding/compressing units 45a, 47a, and 49a or 57a, 58a, and 59a of the receivers 45, 47, and 49 or 57, 58, and 59 hold the response signals according to the holding instruction of the congestion control adjuster 43b or 55b. If the set period of time ends (S607), the receivers 45, 47, and 49 or 57, 58, and 59 transmit the held response signals to the transmitter 41 or 51a, 51b, and 51c (S609).

If a queue status of data packets is not over the first threshold, the congestion control adjuster 43b or 55b decides whether the queue status of data packets is over the second threshold. Here, the second threshold is set to be smaller than the first threshold.

If a queue status of data packets is over the second threshold (S611), the congestion control adjuster 43b or 55b instructs the corresponding receivers 45, 47, and 49 or 57, 58, and 59 to compress response signals for a set period of time (S613). Here, the compression includes an occasion that only the response signals most recently occurring out of the response signals occurring with respect to data packets received from the receivers 45, 47, and 49 or 57, 58, and 59 are compressed. The receivers 45, 47, and 49 or 57, 58, and 59 compress response signals for a set period of time according to the instruction of the congestion control adjuster 43b or 55b. If the set period of time ends (S615), the receivers 45, 47, and 49 or 57, 58, and 59 transmit the compressed response signals to the transmitter 41 or 51a, 51b, and 51c (S617).

Figure 7:
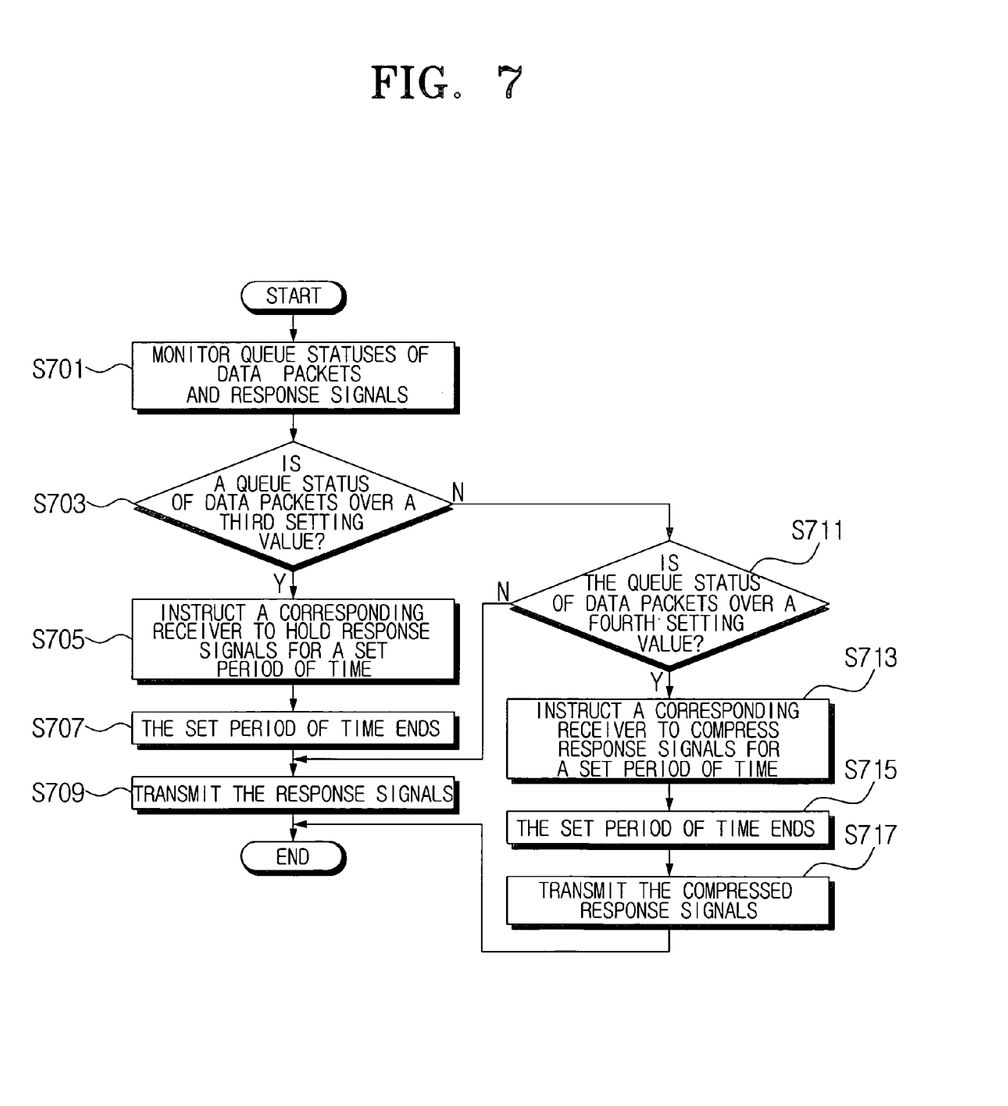
FIG. 7 is a flow chart for explaining a communication method for the communication systems shown in FIG. 4 and FIG. 5 according to a second embodiment of the present invention.

FIG. 7 is a flow chart for explaining a communication method for the communication systems shown in FIG. 4 and FIG. 5 according to a second embodiment of the present invention. FIG. 7 shows an occasion that the queue status monitor 43a or 55a of the DSLAM 43 or the gateway 55 monitors queue statuses of data packets and response signals.

In FIG. 7, the queue status monitor 43a or 55a of the DSLAM 43 or the gateway 55 monitors queue statuses of data packets and response signals transmitted from the transmitters 41 or 51a, 51b, and 51c to the receivers 45, 47, and 49 or 57, 58, and 59 (S701). Here, the queue status monitor 43a or 55a monitors data packets transmitted from one transmitter 41 to at least one of the plurality of receivers 45, 47, and 49 in case of the DSLAM 43, and monitors a queue status of data packets transmitted from at least one of the plurality of transmitters 51a, 51b, and 51c to at least one of the plurality of receivers 57, 58, and 59 in case of the gateway 55. Further, the queue status monitor 43a or 55a monitors a queue status of response signals transmitted from at least one of the plurality receivers 45, 47, and 49 to one transmitter 41 in case of the DSLAM 43, and monitors a queue status of response signals transmitted from at least one of the plurality of receivers 57, 58, and 59 to at least one of the plurality of transmitters 51a, 51b, and 51c in case of the gateway 55.

The congestion control adjuster 43b or 55b classifies a queue status into the smooth status, the first congestion status, and the second congestion status based on a status of the data packets stored in the buffer, as monitored by the queue status monitor 43a or 55a. Here, the first congestion status refers to a status that data packets stored in the buffer are over a third threshold, and the second congestion status refers to an occasion that data packets stored in the buffer are over a fourth threshold. In this case, the third threshold and the fourth threshold may be set to be the same.

If the number of respective data packets stored in the buffer is over the third threshold (S703), the congestion control adjuster 43b or 55b instructs the corresponding receivers 45, 47, and 49 or 57, 58, and 59 to hold response signals for a set period of time (S705). In this occasion, it is preferable that the set period of time is stored in a memory (not shown). The ACK packet holding/compressing units 45a, 47a, and 49a or 57a, 58a, and 59a of the receivers 45, 47, and 49 or 57, 58, and 59 hold the response signals according to the holding instruction of the congestion control adjuster 43b or 55b. If the set period of time ends (S707), the receivers 45, 47, and 49 or 57, 58, and 59 transmit the held response signals to the transmitter 41 or 51a, 51b, and 51c (S709).

If a queue status of data packets is not over the third threshold, the congestion control adjuster 43b or 55b decides whether the queue status of data packets is over the fourth threshold. Here, it is implemented that the fourth threshold is set to be smaller than the third threshold.

If a queue status of data packets is over the fourth threshold (S711), the congestion control adjuster 43b or 55b instructs the corresponding receivers 45, 47, and 49 or 57, 58, and 59 to compress response signals for a set period of time (S713). Here, the compression includes an occasion that only the response signals most recently occurring out of the response signals occurring with respect to data packets received from the receivers 45, 47, and 49 or 57, 58, and 59. The receivers 45, 47, and 49 or 57, 58, and 59 compress response signals for a set period of time according to the instruction of the congestion control adjuster 43b or 55b. If the set period of time ends (S715), the receivers 45, 47, and 49 or 57, 58, and 59 transmit the compressed response signals to the transmitter 41 or 51a, 51b, and 51c (S717).

The present invention can carry out efficient TCP congestion controls by reducing a load of the TCP congestion controls of the transmitters and receivers with TCP congestion controls processed in the middle of communication lines rather than in the transmitters or the receivers in the prior art.

Further, the present invention can improve a TCP transmission efficiency by carrying out congestion controls with respect to all the downlink and uplink traffic rather than with respect to only the downlink traffic or only the uplink traffic in the transmitters or the receivers in the prior art.

The invention has been shown and described with reference to certain illustrative, non-limiting embodiments thereof, and it will be understood by those skilled in the art that various changes in form and details may be made therein without departing from the spirit and scope of the invention as defined by the appended claims.

What is claimed is:

1. A communication system, comprising:
   a transmitter for transmitting one or more data packets;
   at least one receiver connected to the transmitter, for receiving the data packets and transmitting to the transmitter one or more response signals in response to the received data packets; and
   a multiplexer for multiplexing and transmitting to the transmitter the response signals transmitted from the receiver, and transmitting the transmitted data packets from the transmitter to a corresponding receiver, the multiplexer composed of:
      a queue status monitor; and
      a congestion control adjuster,
      wherein the queue status monitor monitors a queue status of at least one of the transmitted data packets and the response signals, and
      wherein the congestion control adjuster instructs the receiver to compress the response signals based on the monitored queue status, and
   wherein the receiver includes a response signal holding/compressing unit for, if the congestion control adjuster disposed between the transmitter and the at least one receiver predicts that congestion will occur with the response signals transmitted to the transmitter from the receiver, compressing the response signals for a predetermined period of time, as instructed by the congestion control adjuster, and
   wherein the queue status monitor is disposed inside the multiplexer.

2. The communication system as claimed in claim 1, wherein the congestion control adjuster instructs the corresponding receiver to hold the response signals if the queue status of the monitored data packets is over a first threshold.

3. The communication system as claimed in claim 1, wherein the congestion control adjuster instructs the corresponding receiver to compress the response signals if the queue status of the monitored data packets is under a first threshold and over a second threshold.

4. The communication system as claimed in claim 1, wherein the congestion control adjuster instructs the corresponding receiver to compress the response signals if the queue status of the monitored data packets is under a first threshold and the queue status of the response signals is over a second threshold.

5. The communication system as claimed in claim 1, wherein the transmitter transmits the data packets at a first transmission rate exceeding 6 Mbps, and the receiver transmits the response signals at a second transmission rate under 900 Kbps.

6. The communication system according to claim 1, further comprising a first-in first-out (FIFO) buffer which outputs one of: the one or more data packets transmitted from the transmitter and the one or more response signals transmitted from the receivers.

7. A communication system, comprising:
   at least one transmitter for transmitting one or more data packets;
   at least one receiver belonging to a private network and connected to the transmitter, for receiving the data packets and transmitting to the transmitter one or more response signals in response to the received data packets; and
   a gateway for arbitrating a communication protocol between the transmitter and the private network, the gateway composed of:
   a queue status monitor; and
   a congestion control adjuster;
   wherein the queue status monitor monitors a queue status of at least one of the transmitted data packets and the response signals, and
   wherein the congestion control adjuster instructs the receiver to compress the response signals based on the monitored queue status, and
   wherein the receiver includes a response signal holding/compressing unit for, if the congestion control adjuster disposed between the at least one transmitter and the at least one receiver predicts that congestion will occur with the response signals transmitted to the transmitter from the receiver, compressing the response signals for a predetermined period of time, as instructed by the congestion control adjuster, and
   wherein the queue status monitor is disposed inside the gateway.

8. The communication system as claimed in claim 7, wherein the congestion control adjuster instructs a corresponding receiver to hold the response signals if the queue status of the monitored data packets is over a first threshold.

9. The communication system as claimed in claim 7, wherein the congestion control adjuster instructs a corresponding receiver to compress the response signals if the queue status of the monitored data packets is under a first threshold and over a second threshold.

10. The communication system as claimed in claim 7, wherein the congestion control adjuster instructs a corresponding receiver to compress the response signals if the queue status of the monitored data packets is under a first threshold and the queue status of the response signals is over a second threshold.

11. The communication system as claimed in claim 7, wherein the transmitter transmits the data packets at a first transmission rate exceeding 6 Mbps, and the receiver transmits the response signals at a second transmission rate under 900 Kbps.

12. A communication method in which a receiver receiving data packets from a transmitter transmits to the transmitter response signals corresponding to the data packets, comprising:
    monitoring a queue status of at least one of the data packets and the response signals;
    instructing the receiver to compress the response signals based on the monitored queue status; and
    if a congestion control adjuster disposed between the transmitter and the receiver predicts that congestion will occur with the response signals transmitted to the transmitter from the receiver, compressing the response signals for a predetermined period of time, as instructed by the congestion control adjuster.

13. The communication method as claimed in claim 12, wherein the congestion control adjuster instructs a corresponding receiver to hold the response signals if the monitored queue status of the data packets is over a first threshold.

14. The communication method as claimed in claim 12, wherein the congestion control adjuster instructs a corresponding receiver to compress the response signals if the monitored queue status of the data packets is under a first threshold and over a second threshold.

15. The communication method as claimed in claim 12, wherein the congestion control adjuster instructs a corresponding receiver to compress the response signals if the monitored queue status of the data packets is under a first threshold and the monitored queue status of the response signals is over a second threshold.

* * * * *